Jan. 5, 1965 R. W. ERLBACHER 3,164,105
GANTRY CRANE
Filed July 21, 1961 2 Sheets-Sheet 1
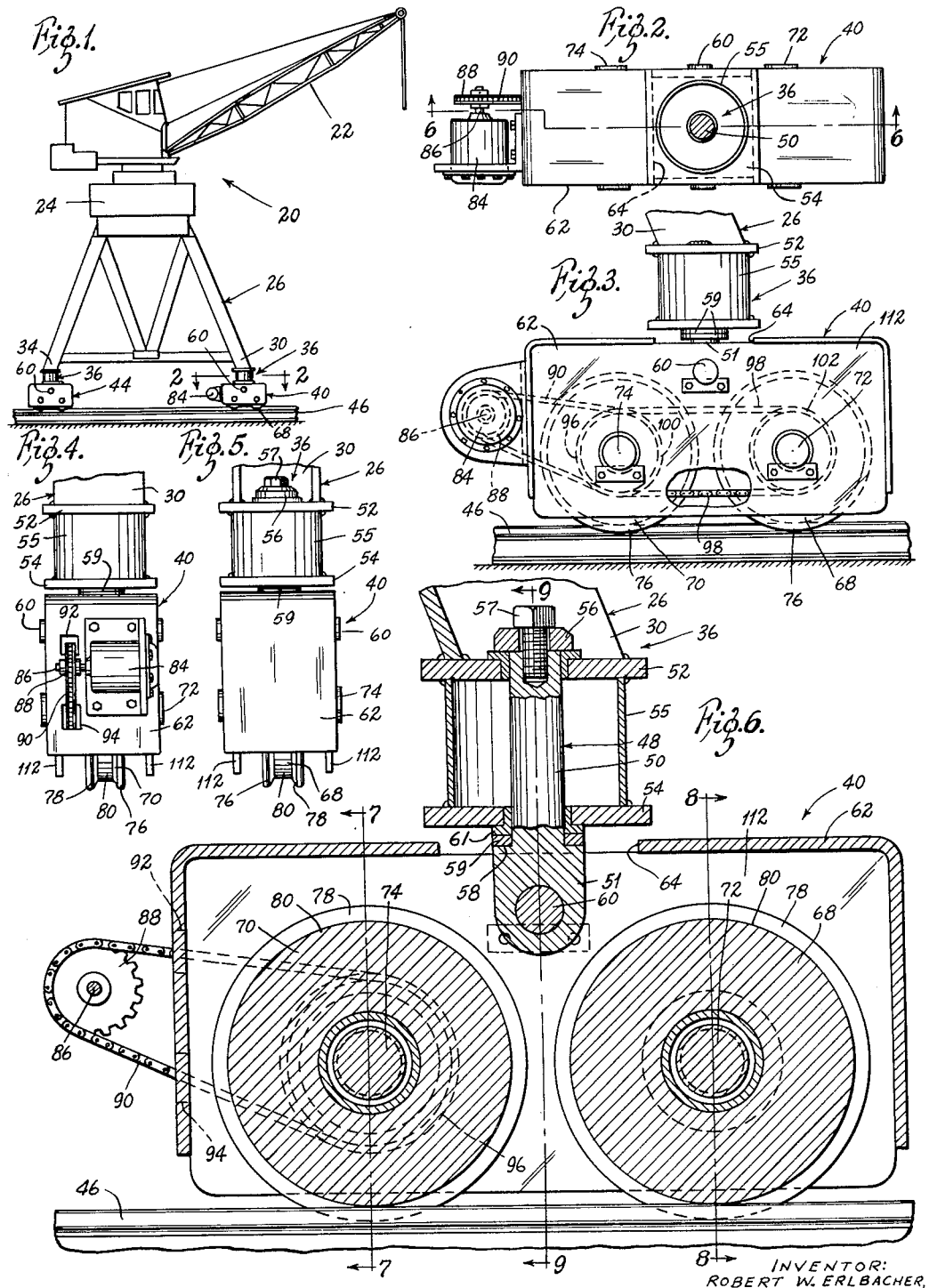
INVENTOR:
ROBERT W. ERLBACHER,
BY Kingsland, Rogers, Ezell & Robbins
ATTORNEYS Jan. 5, 1965   R. W. ERLBACHER   3,164,105
GANTRY CRANE
Filed July 21, 1961   2 Sheets-Sheet 2
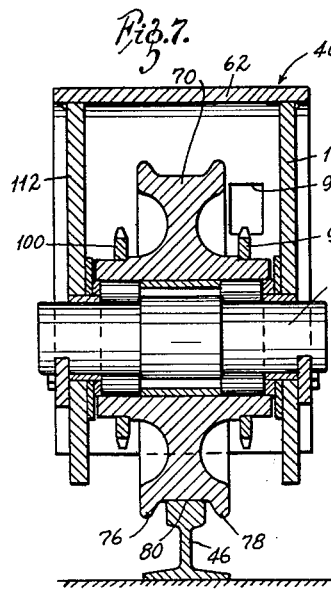
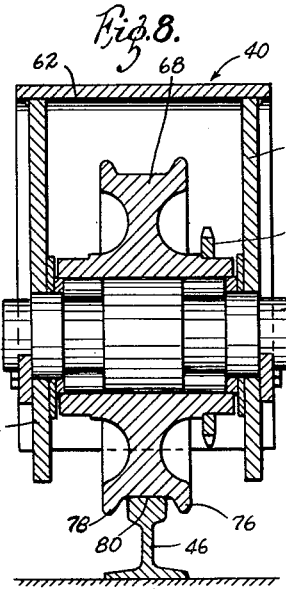
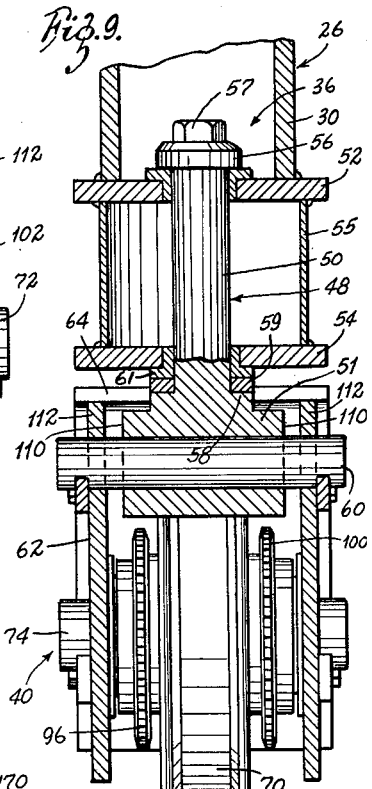
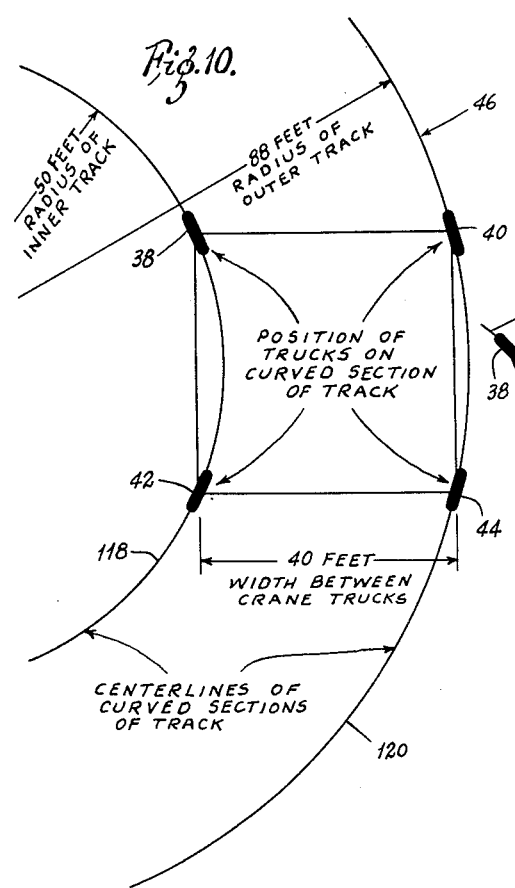
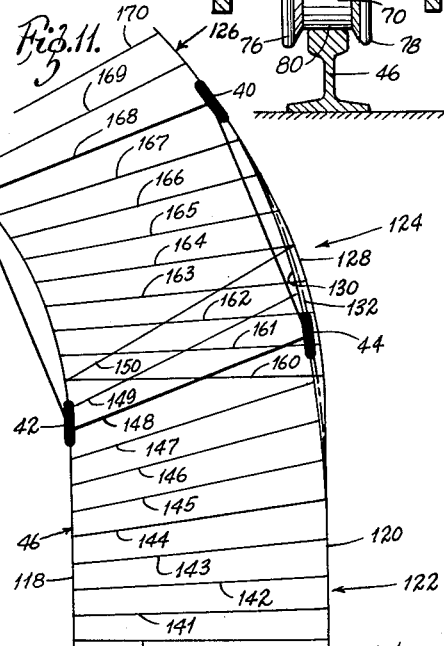
INVENTOR:
ROBERT W. ERLBACHER
By Kingsland, Rogers, Ezell & Robbins
ATTORNEYS March Jan. 5, 1965

3,164,105
GANTRY CRANE
Robert W. Erlbacher, 920 N. Fountain,
Cape Girardeau, Mo.
Filed July 21, 1961, Ser. No. 125,767
6 Claims. (Cl. 105—27)

This invention relates to improvements in gantry cranes and, in particular, is concerned with improvements in the supporting frame and wheeled trucks supporting the frame and which are adapted to engage a track having sharp radii.

It has been a problem in the past to provide gantry cranes that are adapted to be supported by steel wheels and which move along tracks on loading docks and the like where there are sharp curves. By means of this invention there has been provided a gantry frame having trucks supporting wheels therein in which the trucks are adapted to shift axially as the gantry crane moves around a sharply curved track. The movement of the wheels and the trucks compensates for varying positions of the trucks with respect to the track to account for changed movement along the curve.

It is a further feature of this invention to provide wheeled trucks supporting a gantry frame in which the trucks can move laterally with respect to the frame and hug a supporting rail by means of doubly flanged wheels, which provide a self steering feature for the gantry frame.

It is still another feature of this invention that the gantry frame is provided with trucks which are supported from the gantry frame in such a manner that they may oscillate somewhat about a horizontal axis to accommodate for unevenness in the rails upon which the gantry rides and also wherein the trucks can move laterally to a slight degree to compensate for distance between centers as the frame rounds a sharp curve.

It is another feature of this invention that a specially designed gantry track is employed in combination with the gantry using the trucks that can move slightly laterally. The track is designed using the inner rail of the track at a constant radius, while the outer rail of the track is an average of the tracing of the outer front truck center of the gantry frame and the outer rear truck center. It will be understood that two tracings are obtained with the front outside truck center giving a tracing that is of a larger diameter than the rear truck center tracing. The average is determined by merely taking the difference between the inner and outer tracings.

It is still another feature of this invention that a gantry frame is provided in which motorized trucks are employed for the gantry frame with these trucks having wheels that closely hug a gantry track and which are adapted to oscillate and shift laterally to provide for irregularities and curves in the track, and to obtain self steering of the gantry by providing doubly flanged gantry wheels.

Other objects of this invention will appear in the detailed description which follows and will be otherwise apparent to those skilled in the art.

For the purpose of illustration there is shown in the accompanying drawings a preferred embodiment of this invention. It is to be understood that these drawings are for the purpose of example only, however, and that the invention is not limited thereto. Thus, instead of being limited to a gantry crane, the frame and specially designed trucks and the track can be used for other types of installations besides gantry cranes per se.

In the drawings:

FIGURE 1 is a view in elevation showing a gantry crane mounted upon a gantry frame having the wheeled trucks of this invention carried by a gantry track;

FIGURE 2 is an enlarged view in section on line 2—2 of FIGURE 1 showing the trunnion mounting for the right front truck;

FIGURE 3 is a front elevation view of the truck shown in FIGURE 2;

FIGURE 4 is a side view taken from the left side of FIGURE 3 showing the truck;

FIGURE 5 is a side view taken from the right side of the truck of FIGURE 3;

FIGURE 6 is an enlarged view in section taken on the line 6—6 of FIGURE 2 showing the trunnion construction and the driving means for the wheels;

FIGURE 7 is a view in section taken on line 7—7 of FIGURE 6 showing the rear wheel structure and means for connecting it to a motor drive shaft sprocket;

FIGURE 8 is a view in section taken on the line 8—8 of FIGURE 6 showing the structure of the front wheel;

FIGURE 9 is a view in section taken on the line 9—9 of FIGURE 6 showing the trunnion structure for mounting the truck housing to the bottom of the gantry frame leg;

FIGURE 10 is a schematic diagram showing the gantry frame and trucks positioned on a narrow curve; and FIGURE 11 is a schematic diagram showing the positioning of the gantry frame and its wheels on a transition curve between the straight portion of the track and the fully curved portion just as the frame rounds the curve with means for laying out a special curve that is an average between the tracing of the right front truck center and right rear truck center.

The gantry crane is best shown in FIGURE 1 and is generally indicated by the reference numeral 20. It has the usual boom 22 and is mounted upon a rotary platform 24 supported by a gantry frame 26. The gantry frame has a left front leg not shown, a right front leg 30, a left rear leg not shown, and a right rear leg 34. These legs are individually connected through a trunnion means 36, which is identical for each leg, a right front truck 40, and a right rear truck 44 as shown in FIGURE 1. These trucks are shown schematically in FIGURES 10 and 11 as well as left front truck 38 and left rear truck 42. The entire crane is mounted upon gantry tracks 46.

The trunnion means 36 and the structure of the trucks are best shown in FIGURES 2 through 9. Particular reference for the structure of the trunnion structure is made to FIGURES 2, 3, 6 and 9. Thus, the trunnion is comprised of a T-shaped trunnion knuckle element 48. The element 48, as shown in FIGURE 6, is comprised of a shaft portion 50 and a hub-shaped bearing portion 51 which is rotatably supported within the leg 30, as shown for the right front gantry frame leg in FIGURE 6. This support is provided by means of a top support plate 52 and a bottom support plate 54 spaced from one another by a protective sleeve 55; an end washer 56 fitting around a cap screw 57 threadedly received within an opening at the top of the shaft portion holds the end of said shaft portion in place while permitting rotation.

The bottom of the knuckle element 48 is provided with the bearing portion 51 having a shoulder 58 which, through spring washer 59 and bearing 61, engages the bottom support plate. The journal portion rotatably receives a truck housing connecting shaft 60. The ends of the shaft 60 are in turn journaled within the sides of the truck housing described below. By means of the above structure, the knuckle element through the shaft 50 can pivot about the vertical axis of the shaft with respect to the leg to provide for turning of the truck housing with respect to the leg. Also, by means of the shaft 60, received within the bearing portion 51, the truck housing may oscillate back and forth to accommodate for irregularities in the track.

The trucks 38, 40, 42 and 44 are all of similar construction and for the purpose of convenience only the right front truck 40 will be described. It will be understood that only this truck may be motorized, or, where additional power is desired, all of the trucks may be provided with motors to provide power for moving the wheels located within the trucks.

The truck 40 is comprised of a housing 62, which receives, in journalled relation in its sides, the support shaft 60 passing through the bearing portion of the knuckle element connecting the truck to the gantry leg. The housing has a central opening 64 at the top wall to provide for a slight degree of oscillation of the housing with respect to the leg and permit some freedom of movement of the knuckle element passing therethrough.

The truck 40 is further provided with a pair of front and rear wheels 68 and 70 connected in tandem. The front wheel is supported within the truck by means of an axle 72, while the rear wheel is likewise supported within the truck by an axle 74. Both of the wheels are identical in construction and each has a pair of circumferential inwardly beveled flanges 76 and 78 which merge into a track bearing surface 80. This construction provides for self centering and self steering of the wheels as they pass along the track and provide for guiding of the truck along the curved sections of the track.

In order to provide for prime movement to the wheels a motor 84 is mounted to the rear of the truck housing 62. This is best shown in FIGURES 3 and 4. The motor has a shaft 86 connected to a sprocket gear 88 and a sprocket chain 90 passing through openings 92 and 94 in the rear wall of the housing provides power to the rear wheel 70. This power is effected by a sprocket wheel 96 keyed to the axle 74. A take-off sprocket chain 98 provides for imparting power to the front wheel 68 by connections to sprocket gears 100 and 102 connected to the rear and front axles 74 and 72, respectively.

USE

The gantry frame and the wheeled trucks of this invention may be simply constructed according to the structures described. The trunnion mounting means provides for pivoting of the trucks with respect to the leg through the shaft portion 50. Likewise the shaft 60 connecting the housing to the trunnion knuckle element provides for a degree of oscillation of the housing with respect to the frame to accommodate irregularities in the track.

Thus by the structure described the tandem wheels in the housing can be turned about a vertical axis and can also be turned about a horizontal axis to a slight degree. Self steering is effected by the doubly flanged wheels which are guided along the gantry track.

As an important feature of the invention to provide for lateral movement of the wheels with respect to the gantry frame the trunnion mounting means has an axial or lateral degree of movement to provide for self alignment and steering. Particular reference will be made to FIGURE 9 where it will be seen that the bearing portion of the trunnion knuckle element has an end 110 spaced from the inner side wall 112 of the housing. This condition is also true for the opposite side of the bearing portion and the opposite inner side wall, as FIGURE 9 shows a centered position. Thus, the truck may move in an axial direction back and forth with respect to the bearing and portion 110, as is apparent from FIGURE 9. By this means shortening or effective lengthening of the distance between the left and right trucks at the front of the gantry frame and between the left and right trucks at the rear of the gantry frame may be effected. This is particularly valuable when the gantry is moved around sharp curves, as will be more fully discussed below.

The above structure, when motorized with the truck mounted motor, provides a very effective means for moving a gantry along gantry tracks. In addition to the single motor shown, it will be readily understood that additional motors may be employed on any one or all of the additional trucks and motor operation can be controlled in an obvious manner by providing the usual connections to the gantry crane to be operated by a gantry operator in the cab.

Reference will now be made to the operation of the wheels of the gantry frame on the curves of FIGURES 10 and 11. FIGURE 10 shows a curved track 46 having an inner rail 118 of a constant radius, which, for purpose of example, may be 50 feet. The outer rail 120 is also of a constant radius, which, for purpose of example, may be 88 feet giving an effective gauge of 38 feet. The distance between the normal centers of the front left and right trucks 38 and 40 is 40 feet, which is the same distance between the front legs as well as the rear legs. Because of the askew relationship of the trucks at the front and the rear, they accommodate the effective gauge of 38 feet. This gauge of 38 feet is 2 feet smaller than the axial distance between the normal centers of the trucks at the front and the rear.

The problem in designing the trucks for the crane and in designing the curve rests in moving the gantry from a straight section of track with a gauge of 40 into the curve section with a gauge of 38 feet. FIGURE 11 shows a convenient means for designing such a transition curve to accommodate the axially movable trucks mounted upon the gantry crane. The bottom portion of tracks 118 and 120 in FIGURE 11 has a straight portion of 40 feet gauges generally indicated by the reference numeral 122, while the beginning or transition portion of the curve is designated portion 124, and the completely curved section 126 is shown at the top portion of the drawing and will be understood as being the same as shown in FIGURE 10. The inner track 118 in the transition portion is held constantly on the 50 foot radius. By moving the gantry crane, or a representation of it, in working out the curve along the inner rail and plotting the position of the outer wheels, in this case the right front truck center 40 and the right rear truck center 44, two separate curves are obtained, one for the front right truck and other for the rear right truck. In this case, the outer curve is designated 128 and is traced by the center of the right front truck 40, while the inner curve 130 is traced by the center of the right rear truck 44. By averaging the two curves the shape of the transition track is effected and this average curve is designated 132 located midway between the inner and outer curve. The amount of side play that has to be built into the trucks is determined by the distance from the inner curve to the average curve and from the outer curve to the average curve. In this particular track design for the curve radii shown, the front trucks must decrease between centers by a maximum of approximately 9 inches, that is 4½" for the inside or left front truck 38 and 4½" for the outside truck that is the right front truck 40. The back or rear trucks must increase approximately 9 inches between centers or 4½" for the inside or left rear truck 42 and 4½" for the outside or right rear truck 44. It will be understood that the dimensions listed are, of course, for the purpose of example only and are given to show the accommodation of the gantry upon very tight curves.

In FIGURE 11 the axis of the front trucks is shown in bold black lines indicated 168, while the axis of the rear trucks is indicated by the bold black line 148. In general, the lines indicated 140 to 150 indicate the axis of the rear trucks as they move from the straight track section 122 into the transition curve 124, while the lines 160 to 170 indicate the axis of the front truck for each respective position along the tracks. By means of this invention there has been provided a simply designed and durable truck system for a gantry crane. The trucks may be simply motorized by a hydraulic motor with a high ratio box and gear chained drive to the wheels in which control can be simply effected by a cab operator. The trucks are provided with means for permitting the axial or lateral movement to accommodate the necessary play when the crane moves into a curve. The trunnion bearing also allows the truck to pivot to accommodate unevenness in the tracks. The circumferentially flanged and beveled wheels arranged in tandem provide for self guiding of the trucks and the gantry frame around the curve. It will be understood that gantries are, because of their cumbersome structure and quite high center of gravity, relatively slow moving and are self contained, and, as a result thereof, the invention of the truck system and the provision of the specially designed tracks described has provided a very advantageous advance in the art.

Various changes and modifications may be made within this invention as will be apparent to those skilled in the art. Such changes and modifications are within the scope and teaching of this invention as defined by the claims appended hereto.

What is claimed is:

1. A gantry crane frame having four legs supported by four rectangularly positioned trucks, said trucks each comprising a housing, a pair of axles journalled in tandem in said housing, a pair of wheels carried in tandem upon said axles and each of said wheels having a pair of axially spaced circumferential flanges adapted to contact the opposite sides of a track upon which the crane may be carried and shaft means to permit axial shifting of said wheels with respect to the gantry legs to accommodate tracks of varying gauge, said shaft means connecting said trucks to said legs for rocking movement about a horizontal axis, said last named means comprising a bearing element connected to the bottom of a gantry leg and a shaft secured at its ends to said housing and received within said bearing element in rotative relationship at an intermediate portion.

2. A gantry crane frame having four legs supported by four rectangularly positioned trucks, said trucks each comprising a housing, an axle journalled in said housing, a wheel carried by said axle and said wheel having a pair of axially spaced circumferential flanges adapted to contact the opposite sides of a track upon which the crane may be carried, means mounting said truck housing to a leg in pivotal relation about a vertical axis to effect turning of the crane, and shaft means on said trucks to permit axial shifting of said wheels with respect to the gantry legs to accommodate tracks of varying gauge, said last named means comprising a bearing element connected to the bottom of a gantry leg and receiving in laterally sliding relation a shaft parallel to the wheel axle and secured to opposite side walls of said housing, said bearing element having a width less than that of the distance between the walls of said housing whereby relative sliding movement of the housing with respect to said gantry leg may be effected.

3. A gantry crane frame having four legs supported by four rectangularly positioned trucks, said trucks each comprising a housing, an axle journalled in said housing, a wheel carried by said axle and said wheel having a pair of axially spaced circumferential flanges adapted to contact the opposite sides of a track upon which the crane may be carried, means mounting said truck housing to a leg in pivotal relation about a vertical axis to effect turning of the crane, said means comprising a vertical shaft element connected at a lower end to said truck housing and secured for rotation relative to the bottom of the gantry leg at its upper end, and shaft means on said truck to permit axial shifting of said wheels with respect to the gantry legs to accommodate tracks of varying gauge, said last named means comprising a bearing element connected to the bottom of said vertical shaft and receiving in laterally sliding relation a shaft parallel to the wheel axle and secured to said housing.

4. A gantry crane frame having four legs supported by four rectangularly positioned trucks, said trucks each comprising a housing, a pair of axles each carrying a wheel journalled in tandem in said housing, means for connecting the truck housings to said legs for relative rocking movement about a horizontal axis, said wheels having a pair of axially spaced circumferential flanges adapted to contact the opposite sides of a track upon which the crane may be carried, means mounting said truck housing to a leg in pivotal relation about a vertical axis to effect turning of the crane and shaft means to permit axial shifting of said wheels with respect to the gantry legs to accommodate tracks of varying gauge.

5. A gantry crane frame having four legs supported by four rectangularly positioned trucks, said trucks each comprising a housing, a pair of axles each carrying a wheel journalled in tandem in said housing, shaft means connecting the truck housings to said legs for relative rocking movement about a horizontal shaft secured to the housing in parallel relation to said axles, said shaft having a sliding surface substantially equal to the distance between the walls of said housing, said wheels having a pair of axially spaced circumferential flanges adapted to contact the opposite sides of a track upon which the crane may be carried, means mounting said truck housing to a leg in pivotal relation about a vertical axis to permit turning of the crane, said means comprising a vertical shaft element connected at a lower end to said truck housing and secured for rotation relative to the bottom of the gantry leg at its upper end, and shaft means to permit axial shifting of said wheels with respect to the gantry legs to accommodate tracks of varying gauge, said last named means comprising a bearing element connected to the bottom of said vertical shaft and receiving in laterally sliding relation the aforementioned horizontal shaft secured inside the housing to opposite side walls of said housing, said bearing element having a width less than that of the distance between the walls of said housing whereby relative sliding movement of the housing with respect to said gantry leg may be effected.

6. A gantry crane frame having four legs supported by four rectangularly positioned trucks, said trucks each comprising a housing, a pair of axles each carrying a wheel journalled in tandem in said housing, shaft means connecting the truck housings to said legs for relative rocking movement about a horizontal shaft secured to the housing in parallel relation to said axles, said wheels having a pair of axially spaced circumferential flanges adapted to contact the opposite sides of a track upon which the crane may be carried, means mounting said truck housing to a leg in pivotal relation about a vertical axis to permit turning of the crane, said means comprising a vertical shaft element connected at a lower end to said truck housing and secured for rotation relative to the bottom of the gantry leg at its upper end, and means to permit axial shifting of said wheels with respect to the gantry legs to accommodate tracks of varying gauge, said last named means comprising an element connected to the bottom of said vertical shaft and receiving in laterally sliding relation the aforementioned horizontal shaft secured to said housing, and means for propelling said crane along the track comprising a motor mounted upon one of said trucks and having means connecting a power shaft of said motor to a first one of said axles and power take off means connecting said first axle with the second axle.

References Cited in the file of this patent

UNITED STATES PATENTS

| 782,034 | Johnston | Feb. 7, 1905 |
| 2,209,392 | Edwards | July 30, 1940 |
| 2,526,307 | Varda | Oct. 17, 1950 |
| 2,595,992 | Tapp et al. | May 6, 1952 |
| 2,955,546 | Liebherr et al. | Oct. 11, 1960 |

FOREIGN PATENTS

| 755,005 | Great Britain | Aug. 15, 1956 |